Sept. 7, 1943.                G. C. KOTZBACK                2,328,912
                                PISTON RING
                            Filed July 15, 1942
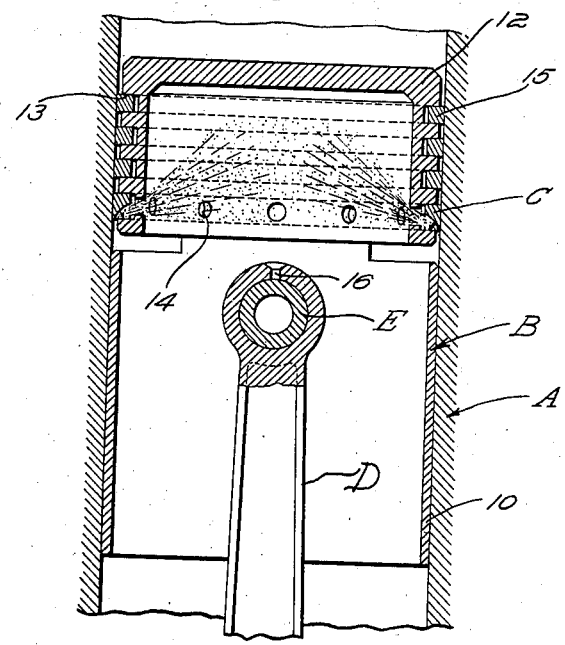
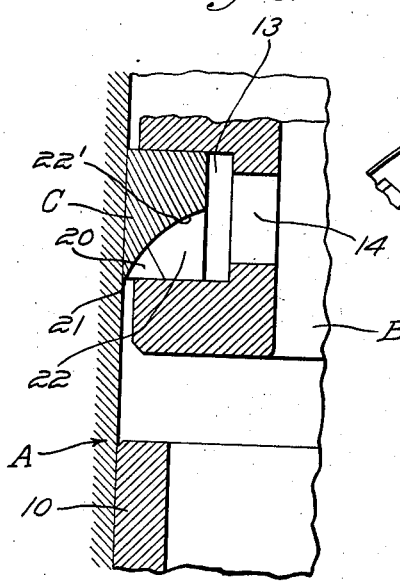
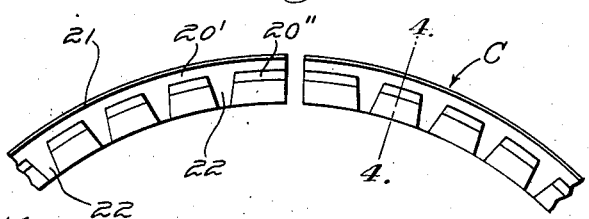
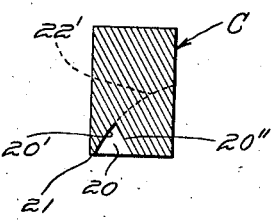
Inventor
Gustav C. Kotzback
by Lindsey and Robillard
Attorneys Patented Sept. 7, 1943

2,328,912

UNITED STATES PATENT OFFICE 2,328,912

PISTON RING

Gustav C. Kotzback, New Britain, Conn.

Application July 15, 1942, Serial No. 450,952

5 Claims. (Cl. 309—7)

The present invention relates to piston rings such as are employed in internal combustion engines for preventing oil from leaking past the piston and into the combustion chamber.

An object of the invention is to provide an improved piston ring having various features of novelty and advantage and which is particularly characterized by its efficiency in operation in that it will effectively wipe excess oil from the wall of the cylinder on the down stroke of the piston; prevent the oil from leaking past the ring into the combustion chamber; cause the oil, which it wipes off the cylinder wall, to adequately lubricate the wristpin and bushing of the piston and keep the head of the piston cool to an appreciable degree; and keep the grooves in the ring and the drain holes in the piston behind the ring clean and free from dirt or carbon.

My improved ring may be economically made and is very sturdy in construction. The arrangement is such that it may be readily installed in the piston groove with less chance of breakage, and in use it has a long life. It may be applied to pistons now in general use without changing the construction of the pistons.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown one embodiment of the invention:

Figure 1 is a central longitudinal sectional view through a piston located within a cylinder, the lowermost groove of the piston being provided with a ring constructed in accordance with the present invention;

Fig. 2 is a fragmentary sectional view of the cylinder, piston, and ring on an enlarged scale;

Fig. 3 is an enlarged fragmentary bottom plan view of my improved ring; and

Fig. 4 is an enlarged sectional view through the ring, the same being taken on substantially line 4—4 of Fig. 3.

Referring to the drawing in detail, A denotes a cylinder of an internal combustion engine or the like, the cylinder being shown more or less fragmentarily as the particular construction thereof forms no part of the present invention. The letter B designates a piston mounted for reciprocation within the cylinder. This piston may be of any suitable construction, that shown in the drawing being of an old and well-known type. It may have a skirt 10 fitting closely within the cylinder, and a head 12 of slightly lesser diameter than the skirt so that there is a clearance between the periphery of the head and the wall of the cylinder. This head is provided with a plurality of ring grooves 13, four being shown by way of illustration. These grooves, as is usual, are rectangular in cross section. For the purpose of permitting the oil, which is scraped off of the cylinder wall by my improved ring, to pass from the lowermost groove 13 to the interior of the piston, the latter is provided with drain holes 14. These drain holes, which are of substantial size, extend through the wall of the piston behind the lowermost ring groove and are located between the planes of the upper and lower walls of that groove. Located in the lowermost ring groove 13 is my improved oil regulating or control ring C, and located in the remaining grooves are the usual compression rings 15. If desired, however, my improved ring may be used as a compression ring. The letter D designates the usual connecting rod having a sleeve or bushing at its upper end journaled on the wristpin E carried by the piston internally thereof. The bushing of the connecting rod has the usual oil hole 16 through which oil may pass in order to keep the contacting surfaces between the bushing and the wristpin in lubricated condition. The structure so far described, except for my improved piston ring, is an ordinary one and needs no further description.

Referring now to my improved piston ring C, the same comprises a split expansible ring of cast iron or other suitable material. The ring has a wall, generally rectangular in cross section, and is of such axial dimension as to closely fit within a groove of the piston. The ring, when located within the piston groove, will, of course, expand against the cylinder wall, as is usually the case. Provided in the bottom face of the ring C is an annular oil collecting channel or groove 20 which is preferably of generally inverted V shape, the same having an outer wall 20' and an inner wall 20''. This channel 20 is located immediately adjacent the outer periphery of the ring so that the external periphery of the ring and the outer wall 20' of the groove 20 forms, at the lower outer corner of the ring, an annular scraping edge 21. When the ring is placed within the groove 13 of the piston, the annular groove will extend beyond the peripheral edge of the bottom wall of the piston groove 13. By preference, and as shown in Fig. 4, the scraping edge 21 is initially somewhat blunted. Leading from the annular groove 20 to the inner face of the piston ring C are radial grooves or channels 22 which increase in vertical depth towards the inner periphery of the ring. The upper walls of these radial channels lead from the apex of the annular groove 20 to the inner face of the ring substantially midway between the lower and upper faces of the latter. It will thus be seen that the upper walls 22' of these radial channels form continuations of the outer wall 20' of the annular groove and are inclined upwardly and inwardly to a point where they are in the same general plane as are the drain openings 14 in the piston wall. Furthermore, by preference these radial grooves or channels 22 taper down in transverse width as they approach the inner periphery of the ring, the purpose of which will be described more in detail hereinafter. The radial channels 22 may be formed by a milling cutter, in which event their top walls are curved as indicated.

When it is desired to place my improved ring in a piston groove 13, the ring is expanded, slipped down over the piston head, and sprung into the piston groove. As shown in Fig. 2, when the ring is so located, it expands radially against the cylinder wall A and there is a space between the internal periphery of the ring and the rear wall of the piston groove. The upper and lower surfaces of the ring slidably and closely engage the bottom and upper walls of the piston groove, and the annular groove 20 in the bottom face of the ring extends radially beyond the piston head.

In operation, on the downward stroke of the piston, the lower forward edge 21 of the piston ring will scrape the excess oil from the cylinder wall and, due to the high speed with which the piston descends, this oil will be forced under appreciable pressure into the annular groove 20 and through the radial grooves 22 and the drain holes 14 of the piston into the interior of the piston. The oil is more or less thus sprayed into the head of the piston and, as the piston is rapidly descending, the oil will strike the top wall of the piston. As a result, that wall of the piston will be maintained cooler than would otherwise be the case. Furthermore, some of the oil sprayed into the piston will be thrown onto the bushing of the piston rod so that it will flow through the oil hole 16 and thus effectively maintain the contacting surfaces between the wristpin E and the bushing of the piston rod in lubricated condition. After the ring has been in use for a short time, the outer circumference thereof will be worn back slightly so that the scraping edge 21 becomes sharp, as shown in Fig. 3, to more effectively scrape the excess oil from the cylinder wall on the down stroke of the piston and cause such oil to flow under pressure through the grooves provided in the piston ring to the interior of the piston head. Due to the fact that the radial grooves 22 taper down in width towards their inner ends, there is a tendency to compress the oil as it passes through these grooves with the result that the oil will be discharged with more force therefrom, insuring that the oil will be thereby properly sprayed through the drain holes into the piston head.

It will be seen from the foregoing description, taken in connection with the drawing, that my improved piston ring, since it is devoid of slots such as are usually provided in piston rings, is relatively strong, and the danger of breaking the ring during the operation of inserting it in the oil groove and the likelihood of the ring breaking under the strains to which it is subjected when in use are reduced. The ring may be very economically made, as the wall thereof is rectangular and the annular groove 20 and the radial grooves 22 may be economically provided. The ring is very effective in preventing a leak past the ring and has long wearing qualities, particularly so since the external circumference of the ring presents a full unbroken face to the cylinder wall. Also, since the ring is not weakened by slots, it will have more wall tension where most needed than is the case with the usual slotted ring now in use. Due to the construction and arrangement of the annular groove 20 and the radial grooves 22, the oil, as it is scraped by the ring from the cylinder wall, is caused to flow under appreciable pressure through these grooves and thus effectively keeps the same free of carbon and other clogging matter and, as explained above, the oil is sprayed into the interior of the piston so as to keep the head of the piston cool and the wristpin in lubricated condition. My improved ring may be used with or without expanders.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A split expansible piston ring having a wall generally rectangular in cross section and provided on its bottom face immediately adjacent its outer periphery with an annular channel adapted to extend radially beyond a piston groove when the ring is placed therein, said annular channel having an outer wall and an inner wall, said ring having at its lower outer corner a scraping edge for wiping the excess oil from a cylinder wall and directing the same into said channel, said bottom face of said ring also having radial channels leading from said annular channel through the inner wall thereof to the inner face of said ring, the upper walls of said radial channels extending upwardly and inwardly from the top of said annular channel to the inner face of said ring substantially midway between the upper and lower faces of the latter whereby the oil which is scraped into said groove is directed under pressure into and through drain holes in the rear wall of the piston groove in which the ring is positioned.

2. A split expansible piston ring adapted to be located within a groove of a piston and engageable with the cylinder in which the piston is located and having on its bottom face an inverted generally V-shaped annular groove located immediately adjacent the outer periphery of the ring and adapted to extend radially beyond the piston groove in which the ring is located, the outer periphery of said ring and the outer wall of said groove forming a scraping edge at the lower outer corner of the ring, said ring further having in its bottom face and extending from said annular groove to the inner face of said ring radial grooves, the upper walls of which are inclined upwardly and inwardly from the apex of said annular groove whereby the oil which is scraped into said annular groove is directed under pressure into and through drain holes in the rear wall of the piston groove in which the ring is positioned.

3. A split expansible piston ring having a wall generally rectangular in cross section and provided on its bottom face immediately adjacent its outer periphery with an annular channel adapted to extend radially beyond a piston groove when the ring is placed therein, said ring having at its lower outer corner a scraping edge for wiping the excess oil from a cylinder wall and directing the same into said channel, said bottom face of said ring also having radial channels extending upwardly and inwardly from said annular channel to the inner face of said ring and gradually decreasing in width towards their inner ends.

4. A split expansible piston ring having a wall rectangular in cross section with an outer unbroken face, the bottom face of said ring having an inverted generally V-shaped annular groove located immediately adjacent said outer face of the ring and forming therewith a scraping edge at the lower outer corner of the ring, said ring further having on its bottom face radial grooves extending from said annular groove to the inner face of said ring, said radial grooves decreasing in width towards their inner ends and having their upper walls inclined upwardly from the apex of said annular groove.

5. In combination, a piston having a ring groove and drain holes in the wall behind said groove and between the planes of the upper and lower surfaces of said groove, and a split expansible piston ring in said groove having a wall rectangular in cross section provided with top and bottom faces respectively engaging said surfaces of said groove and an unbroken outer peripheral face, the bottom face of said ring having an annular groove immediately adjacent the outer periphery of said ring and radial grooves extending inwardly from said annular groove to the inner face of said ring, said radial grooves being directed upwardly towards said drain holes, said ring further having at its lower outer corner an annular scraping edge adapted to scrape excess oil from the cylinder and direct the same into said annular groove.

GUSTAV C. KOTZBACK.